US010209883B2

(12) United States Patent
Fyke et al.

(10) Patent No.: US 10,209,883 B2
(45) Date of Patent: *Feb. 19, 2019

(54) METHOD AND APPARATUS FOR LAUNCHING ACTIVITIES

(71) Applicant: BlackBerry Limited, Waterloo (CA)

(72) Inventors: Steven Henry Fyke, Waterloo (CA); Kevin Howard Orr, Elmira (CA); Vahid Moosavi, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 237 days.

This patent is subject to a terminal disclaimer.

(21) Appl. No.: 15/235,903

(22) Filed: Aug. 12, 2016

(65) Prior Publication Data

US 2016/0349988 A1 Dec. 1, 2016

Related U.S. Application Data

(63) Continuation of application No. 13/865,765, filed on Apr. 18, 2013, now Pat. No. 9,417,702, which is a
(Continued)

(51) Int. Cl.
*G06F 3/0488* (2013.01)
*G06F 3/0482* (2013.01)
(Continued)

(52) U.S. Cl.
CPC .......... *G06F 3/04883* (2013.01); *G06F 3/017* (2013.01); *G06F 3/0482* (2013.01);
(Continued)

(58) Field of Classification Search
CPC .... G06F 3/017; G06F 3/04883; G06F 3/0482; G06F 3/04886; G06F 3/04842; H04M 1/72583; H04M 2250/22
See application file for complete search history.

(56) References Cited

U.S. PATENT DOCUMENTS 8,446,371 B2 5/2013 Fyke et al.
2002/0101458 A1 8/2002 Sangiovanni
(Continued)

FOREIGN PATENT DOCUMENTS

EP 1183590 3/2002
EP 1383034 1/2004
WO 2000/75765 12/2000

OTHER PUBLICATIONS

Office Action dated Sep. 5, 2012, in corresponding Canadian patent application No. 2,641,090.
(Continued)

*Primary Examiner* — Tadesse Hailu
(74) *Attorney, Agent, or Firm* — Fish & Richardson P.C.

(57) ABSTRACT

A handheld electronic device having a microprocessor housed within a body including a display area and a contact-sensitive area is disclosed. The contact-sensitive area detects contact engagement therewith and produces instruction data based thereupon. A microprocessor-run software program receives instruction data from the contact-sensitive area. The contact-sensitive area has a home zone area and a plurality of activity launch zone areas. The software program is programmed to process the instruction data and determine sweeping contact motion detected on the contact-sensitive area originating at the home zone area and terminating at one of the plurality of activity launch zone areas. The program responsively launches an operator-instructed activity corresponding to the activity launch zone area at which the sweeping contact motion terminated.

20 Claims, 9 Drawing Sheets

Related U.S. Application Data continuation of application No. 11/960,568, filed on Dec. 19, 2007, now Pat. No. 8,446,371.

(51) Int. Cl.
*H04M 1/725* (2006.01)
*G06F 3/01* (2006.01)
*G06F 3/0484* (2013.01)

(52) U.S. Cl.
CPC .... *G06F 3/04886* (2013.01); *H04M 1/72583* (2013.01); *G06F 3/04842* (2013.01); *H04M 2250/22* (2013.01)

(56) References Cited

U.S. PATENT DOCUMENTS

| | | |
|---|---|---|
| 2005/0110768 A1 | 5/2005 | Marriot et al. |
| 2007/0150842 A1 | 6/2007 | Chaudhri et al. |
| 2007/0236468 A1 | 10/2007 | Tuli |
| 2007/0247431 A1 | 10/2007 | Skillman et al. |
| 2008/0012837 A1 | 1/2008 | Marriott et al. |
| 2008/0098315 A1 | 4/2008 | Chou et al. |
| 2009/0122018 A1 | 5/2009 | Vymenets et al. |
| 2009/0163193 A1 | 6/2009 | Fyke et al. |
| 2010/0127988 A1 | 5/2010 | Park et al. |
| 2013/0246976 A1 | 9/2013 | Fyke et al. |

OTHER PUBLICATIONS

Office Action dated Sep. 9, 2011, in corresponding Canadian patent application No. 2,641,090.

Office Action dated Jan. 27, 2011, in CA Application No. 2,641,090, 5 pages.

Summons to attend oral proceedings pursuant to Rule 115(1) EPC mailed May 15, 2009, in corresponding European patent application No. 07123739.0.

Examination report dated Nov. 6, 2008, in corresponding European patent application No. 07123739.0.

Extended European Search report dated Mar. 18, 2008, in corresponding European patent application No. 07123739.0.

METHOD AND APPARATUS FOR LAUNCHING ACTIVITIES

CROSS REFERENCE TO RELATED APPLICATIONS

This application is a continuation of U.S. patent application Ser. No. 13/865,765, filed Apr. 18, 2013, which is a continuation of U.S. patent application Ser. No. 11/960,568, filed Dec. 19, 2007, now U.S. Pat. No. 8,446,371, and are expressly incorporated by reference in their entireties.

FIELD

This disclosure, in a broad sense, is directed toward a handheld communication device that has wireless communication capabilities and the networks within which the wireless communication device operates. The present disclosure further relates to launching an activity in response to contact with a contact-sensitive area.

BACKGROUND

With the proliferation of wireless communication systems, compatible handheld communication devices are becoming more prevalent, as well as advanced. Whereas in the past such handheld communication devices were typically limited to either voice transmission (cell phones) or text transmission (pagers and PDAs), today's consumer often demands a multifunctional device capable of performing both types of transmissions, including even sending and receiving e-mail. Furthermore, these higher-performance devices can also be capable of sending and receiving other types of data including that which allows the viewing and use of Internet websites. These higher level functionalities necessarily require greater user interaction with the devices through included user interfaces (UIs) which may have originally been designed to accommodate making and receiving telephone calls and sending messages over a related Short Messaging Service (SMS), As might be expected, suppliers of such mobile communication devices and the related service providers are anxious to meet these customer requirements, but the demands of these more advanced functionalities have in many circumstances rendered the traditional user interfaces unsatisfactory, a situation that has caused designers to have to improve the UIs through which users input information and control these sophisticated operations.

Keyboards are used on many handheld devices, including telephones and mobile communication devices. The size of keyboards has been reduced over the years, as newer, smaller devices have become popular. Cell phones, for example, are now sized to fit in one's pocket or the palm of the hand. As the size of the devices has decreased, the more important it has become to utilize the entire keyboard surface as efficiently as possible.

Many keyboards on mobile devices have an input device for navigation through the graphical user interface. These interfaces include such devices as trackballs and rotating wheels which can be used to effect movement of a cursor or pointer, or to scroll up, down and about a. displayed page. These navigation devices often occupy a relatively large amount of space on the incorporating mobile device. Because the navigation device is frequently used and often requires fine control, a lower end size limitation will normally be observed by device designers. To accommodate such larger, more convenient navigation devices on the housing of the mobile device, the amount of space that is available for the keys of the keyboard is correspondingly reduced if the keyboard and navigation device are proximately located to one another.

As users rely more heavily on their handheld electronic devices, users demand that the devices operate easily and intuitively. Many devices available for consumer purchase fall short of achieving such a goal. Furthermore devices are often equipped with detailed menus and a wide array of programs which can be cumbersome for a user. Thus, it is desirable to provide a device for which the user can easily launch applications and input other commands to the handheld electronic device using input devices.

BRIEF DESCRIPTION OF THE DRAWINGS

Exemplary methods and arrangements conducted and configured according to the advantageous solutions presented herein are depicted in the accompanying drawings wherein.

DETAILED DESCRIPTION

Figure 1:
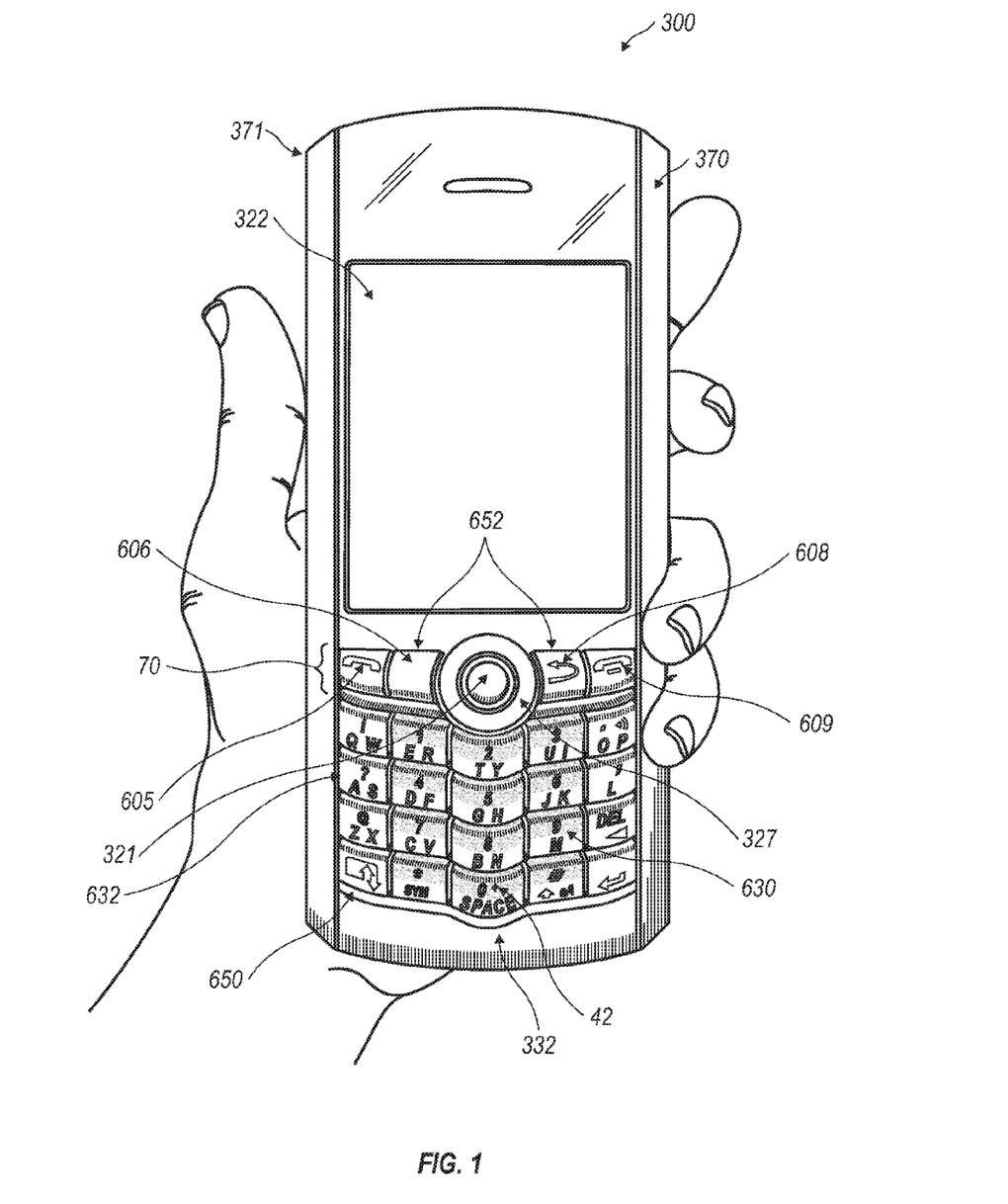
FIG. 1 illustrates a handheld wireless communication device configured according to the present teachings cradled in the palm of a user's hand.
Figure 2:
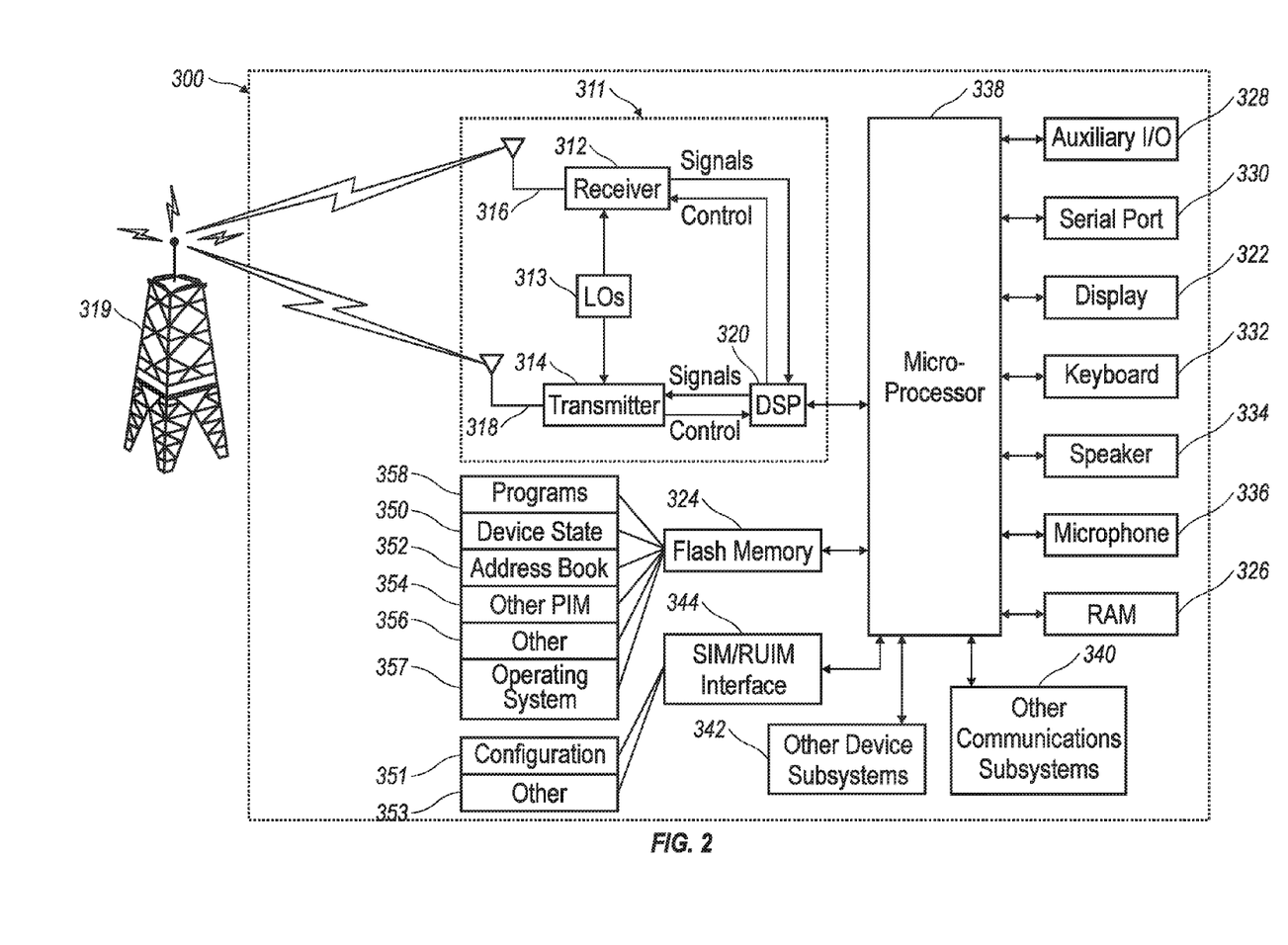
FIG. 2 is a block diagram representing a wireless handheld communication device interacting in a communication network.

An examplary handheld wireless communication device 300 is shown in FIG. 1, and the device's cooperation in a wireless network 319 is exemplified in the block diagram of FIG. 2. These figures are examplary only, and those persons skilled in the art will appreciate the additional elements and modifications necessary to make the device 300 work in particular network environments.

As shown in the block diagram of FIG. 2, the handheld device 300 includes a microprocessor 338 that controls the operation of the device 300. A communication subsystem 311 performs all communication transmission and reception with the wireless network 319. The microprocessor 338 further connects with an auxiliary input/output (I/O) subsystem 328, a serial port (preferably a Universal Serial Bus port) 330, a display 322, a keyboard 332, a speaker 334, a microphone 336, random access memory (RAM) 326, and flash memory 324. Other communication subsystems 340 and other device subsystems 342 are generally indicated as being functionally connected with the microprocessor 338 as well. An example of a communication subsystem 340 is that of a short range communication system such as BLUETOOTH® communication module or a Wi-Fi communication module (a communication module in compliance with IEEE 802.11b) and associated circuits and components. Additionally, the microprocessor 338 is able to perform operating system functions and preferably enables execution of software applications on the handheld wireless communication device 300.

The auxiliary I/O subsystem 328 can take the form of a variety of different navigation tools (multi-directional or single-directional) such as a trackball navigation tool 321 as illustrated in the examplary embodiment shown in FIG. 1, or a thumbwheel, a navigation pad, a joystick, or the like. These navigation tools are preferably located on the front surface of the handheld device 300 but may be located on any exterior surface of the handheld device 300. Other auxiliary I/O subsystems can include external display devices and externally connected keyboards (not shown). While the above examples have been provided in relation to the auxiliary I/O subsystem 328, other subsystems capable of providing input or receiving output from the handheld device 300 are considered within the scope of this disclosure. Additionally, other keys may be placed along the side of the handheld device 300 to function as escape keys, volume control keys, scrolling keys, power switches, or user programmable keys, and may likewise be programmed accordingly.

As may be appreciated from FIG. 1, the handheld wireless communication device 300 comprises a lighted display 322 located above a keyboard 332 constituting a user input and suitable for accommodating textual input to the handheld wireless communication device 300. The front face 370 of the device has a navigation row 70 and a key field 650 that includes alphanumeric keys 630, alphabetic keys 632, numeric keys 42, and other function keys as shown in FIG. 1. As shown, the handheld device 300 is of unibody construction, also known as a "candy-bar" design.

Keys, typically of a push-button or push-pad nature, perform well as data entry devices but present problems to the user when they must also be used to effect navigational control over a screen-cursor. In order to solve this problem the present handheld wireless communication device 300 preferably includes an auxiliary input that acts as a cursor navigation tool and which is also exteriorly located upon the front face 370 of the device 300. Its front face location is particularly advantageous because it makes the tool easily thumb-actuable like the keys of the keyboard. A particularly usable embodiment provides the navigation tool in the form of a trackball 321 which is easily utilized to instruct two-dimensional screen cursor movement in substantially any direction, as well as act as an actuator when the trackball 321 is depressed like a button. The placement of the navigation tool 327 is preferably above the keyboard 332 and below the display screen 322; here, it avoids interference during keyboarding and does not block the user's view of the display screen 322 during use. (See FIG. 1).

Figure 6:
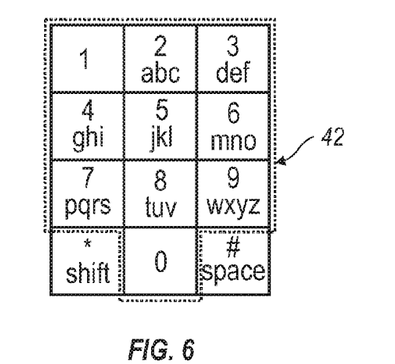
FIG. 6 illustrates a traditional or standard phone key arrangement or layout according to the ITU Standard E.161 including both numerals and letters.

As illustrated in FIG. 1, the present disclosure is directed to a handheld wireless communication device 300 configured to send and receive text messages. The handheld device 300 includes a hand cradleable body 371 configured to be held in one hand by an operator of the device during text entry. A display 322 is included that is located on a front face 370 of the body 371 and upon which information is displayed to the operator during text entry. A key field 650 is also located on the front face 370 of the body 371 and comprises a plurality of keys including a plurality of alphanumeric keys, symbol keys, and function keys. A navigation row 70 including menu keys 652 and a navigation tool 327 is also located on the front face 370 of the body 371. The alphanumeric input keys comprise a plurality of alphabetic and/or numeric keys 632 having letters and/or numbers associated therewith. The order of the letters of the alphabetic keys 632 on the presently disclosed handheld device 300 can be described as being of a traditional, but non-ITU Standard E.161 layout, This terminology has been utilized to delineate the fact that such a telephone keypad as depicted in FIG. 6 may not allow for efficient text entry on the handheld device 300.

The handheld wireless communication device 300 is also configured to send and receive voice communications such as mobile telephone calls, To facilitate telephone calls, two call keys 605, 609 ("outer keys") are provided in the upper, navigation row 70 (so-called because it includes the navigation tool 327) at the outer ends of the navigation row 70. One of the two call keys is a call initiation key 605, and the other is a call termination key 609. The navigation row 70 also includes another pair of keys ("flanking keys") that are located immediately adjacent to the navigation tool 327, with one flanking key on either side of the navigation tool 327. It is noted that the outer keys are referred to as such not because they are necessarily the outermost keys in the navigation row—there may be additional keys located even further outwardly of the outer keys if desired—but rather because they are located outwardly with respect to the flanking keys. The flanking keys may, for instance, constitute the menu keys 652, which include a menu call-up key 606 and an escape or back key 608. The menu call-up key 606 is used to bring up a menu on the display screen 322 and the escape key 608 is used to return to the previous screen or previous menu selection. The functions of the call keys and the menu keys may, of course, be provided by buttons that are located elsewhere on the handheld device 300, with different functions assigned to the outer keys and the flanking keys.

Furthermore, the handheld device 300 is equipped with components to enable operation of various programs, as shown in FIG. 2. In an examplary embodiment, the flash memory 324 is enabled to provide a storage location for the operating system 357, device programs 358, and data. The operating system 357 is generally configured to manage other application programs 358 that are also stored in memory 324 and executable on the processor 338. The operating system 357 honors requests for services made by application programs 358 through predefined application program 358 interfaces. More specifically, the operating system 357 typically determines the order in which multiple applications 358 are executed on the processor 338 and the execution time allotted for each application 358, manages the sharing of memory 324 among multiple applications 358, handles input and output to and from other device subsystems 342, and so on. In addition, users can typically interact directly with the operating system 357 through a user interface usually including the keyboard 332 and display screen 322. While in an exemplary embodiment the operating system 357 is stored in flash memory 324, the operating system 357 in other embodiments is stored in read-only memory (ROM) or similar storage element (not shown). As those skilled in the art will appreciate, the operating system 357, device application 358 or parts thereof may be loaded in RAM 326 or other volatile memory.

In one examplary embodiment, the flash memory 324 contains programs/applications 358 for execution on the handheld device 300 including an address book 352, a personal information manager (PIM) 354, and the device state 350. Furthermore, programs 358 and other information 356 including data can be segregated upon storage in the flash memory 324 of the handheld device 300.

When the handheld device 300 is enabled for two-way communication within the wireless communication network 319, it can send and receive signals from a mobile communication service. Examples of communication systems enabled for two-way communication include, but are not limited to, the General Packet Radio Service (GPRS) network, the Universal Mobile Telecommunication Service (UTMS) network, the Enhanced Data for Global Evolution (EDGE) network, and the Code Division Multiple Access (CDMA) network and those networks, generally described as packet-switched, narrowband, data-only technologies which are mainly used for short burst wireless data transfer. For the systems listed above, the handheld wireless communication device 300 must be properly enabled to transmit and receive signals from the communication network 319. Other systems may not require such identifying information. GPRS, UMTS, and EDGE require the use of a Subscriber Identity Module (SIM) in order to allow communication with the communication network 319. Likewise, most CDMA systems require the use of a Removable Identity Module (RUIM) in order to communicate with the CDMA network. The RUIM and SIM card can be used in multiple different communication devices 300. The handheld communication device 300 may be able to operate some features without a SIM/RUIM card, but it will not be able to communicate with the network 319. A SIM/RUIM interface 344 located within the device 300 allows for removal or insertion of a SIM/RUIM card (not shown). The SIM/RUIM card features memory and holds key configurations 351, and other information 353 such as identification and subscriber related information. With a properly enabled communication device 300, two-way communication between the handheld wireless communication device 300 and communication network 319 is possible.

If the handheld wireless communication device 300 is enabled as described above or the communication network 319 does not require such enablement, the two-way communication enabled handheld device 300 is able to both transmit and receive information from the communication network 319. The transfer of communication can be from the handheld device 300 or to the device 300. In order to communicate with the communication network 319, the handheld device 300 in the presently described examplary embodiment is equipped with an integral or internal antenna 318 for transmitting signals to the communication network 319. Likewise the handheld wireless communication device 300 in the presently described examplary embodiment is equipped with another antenna 316 for receiving communication from the communication network 319. These antennae (316, 318) in another examplary embodiment are combined into a single antenna (not shown). As one skilled in the art would appreciate, the antenna or antennae (316, 318) in another embodiment are externally mounted on the handheld device 300.

When equipped for two-way communication, the handheld wireless communication device 300 features a communication subsystem 311. As is well known in the art, this communication subsystem 311 is modified so that it can support the operational needs of the handheld device 300. The subsystem 311 includes a transmitter 314 and receiver 312 including the associated antenna or antennae (316, 318) as described above, local oscillators (LOs) 313, and a processing module 320 which in the presently described examplary embodiment is a digital signal processor (DSP) 320.

It is contemplated that communication by the handheld device 300 with the wireless network 319 can be any type of communication that both the wireless network 319 and handheld device 300 are enabled to transmit, receive and process. In general, these can be classified as voice and data. Voice communication is communication in which signals for audible sounds are transmitted by the handheld device 300 through the communication network 319. Data is all other types of communication that the handheld device 300 is capable of performing within the constraints of the wireless network 319.

Example device applications that can depend on such data include email, contacts and calendars. For each such application synchronization with home-based versions on the applications can be critical for either or both of their long term and short term utility. As an example, mails are often time sensitive, so substantially real time synchronization is highly desirable. Contacts, on the other hand, can be usually updated less frequently without inconvenience. Therefore, the utility of the handheld device 300 is significantly enhanced (if not enabled) when connectable within a communication system, and particularly when connectable on a wireless basis in a network 319 in which voice, text messaging, and other data transfer are accommodated.

As intimated hereinabove, one of the more important aspects of the handheld wireless communication device 300 to which this disclosure is directed is its size. While some users will grasp the handheld device 300 in both hands, it is intended that a predominance of users will cradle the handheld device 300 in one hand in such a manner that input and control over the handheld device 300 can be effected using the thumb of the same hand in which the handheld device 300 is held. However, it is appreciated that additional control can be effected by using both hands. As a handheld device 300 that is easy to grasp and desirably pocketable, the size of the handheld device 300 must be kept commensurately small. Of the device's dimensions, limiting its width is important for the purpose of assuring cradleability in a user's hand. Moreover, it is preferred that the width of the handheld device 300 be maintained at less than eight centimeters (approximately three inches). Keeping the handheld device 300 within these dimensional limits provides a hand cradleable unit that users prefer for its usability and portability. Limitations with respect to the height (length) of the handheld device 300 are less stringent when considering hand-cradleability. Therefore, in order to gain greater size, the handheld device 300 can be advantageously elongated so that its height is greater than its width, but still remains easily supported and operated in one hand.

A potential drawback is presented by the small size of the handheld device 300 in that there is limited exterior surface area for the inclusion of user input and device output features. This is especially true for the "prime real estate" on the front face 370 of the handheld device 300, where it is most advantageous to include a display screen 322 that outputs information to the user. The display screen 322 is preferably located above a keyboard 332 that is utilized for data entry into the handheld device 300 by the user. If the screen 322 is provided below the keyboard 332, a problem occurs in that viewing the screen 322 is inhibited when the user is inputting data using the keyboard 332. Therefore it is preferred that the display screen 322 be above the input area, thereby solving the problem by assuring that the hands and fingers do not block the view of the screen 322 during data entry periods.

To facilitate textual data entry into the handheld device 300, an alphabetic keyboard 332 is provided. In the exemplary illustrated embodiment, a full alphabetic keyboard 332 is utilized in which there is one key per letter (with some of the letter keys also having numbers, symbols, or functions associated with them). In this regard, the associated letters can be advantageously organized in QWERTY, QWERTZ, AZERTY, or Dvorak layouts, among others, thereby capitalizing on certain users' familiarity with these various letter orders. In order to stay within the bounds of the limited front surface area, however, each of the keys must be commensurately small when, for example, twenty-six keys must be provided in the instance of the English language.

As shown in FIG. 1, the handheld wireless communication device 300 is cradleable in the palm of a user's hand. The handheld device 300 is provided with a keyboard 332 to enter text data and place telephone calls and a display screen 322 for communicating information to the user. A connect/send key 605 is preferably provided to aid in the placement of a phone call. Additionally, a disconnect/end key 609 is provided. The send key 605 and end key 609 preferably are arranged in the navigation row 70 including the navigation tool 327. Additionally, the navigation row 70 preferably has a menu call-up key 606 and a back key or escape key 608.

The keyboard 332 includes a plurality of keys that can be of a physical nature such as actuable buttons, or they can be of a software nature, typically constituted by virtual representations of physical keys on a display screen 322 (referred to herein as "virtual keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space. Input commands and functions can include such things as delete, backspace, moving a cursor up, down, left or right, initiating an arithmetic function or command, initiating a command or function specific to an application program or feature in use, initiating a command or function programmed by the user and other such commands and functions that are well known to those persons skilled in the art. Specific keys or other types of input devices can be used to navigate through the various applications and features thereof. Further, depending on the application 358 or feature in use, specific keys can be enabled or disabled.

In the case of physical keys, all or a portion of the plurality of keys have one or more indicia representing character(s), command(s), and/or functions(s) displayed at their top surface and/or on the surface of the area adjacent the respective key. In the instance where the indicia of a key's function is provided adjacent the key, the indicia can be printed on the device cover beside the key, or in the instance of keys located adjacent the display screen 322 Additionally, current indicia for the key may be temporarily shown nearby the key on the display screen 322.

In the case of virtual keys, the indicia for the respective keys are shown on the display screen 322, which in one embodiment is enabled by touching the display screen 322, for example, with a stylus to generate the character or activate the indicated command or function. Some examples of display screens 322 capable of detecting a touch include resistive, capacitive, projected capacitive, infrared and surface acoustic wave (SAW) touchscreens.

Physical and virtual keys can be combined in many different ways as appreciated by those skilled in the art. In one embodiment, physical and virtual keys are combined such that the plurality of enabled keys for a particular application or feature of the handheld wireless communication device 300 is shown on the display screen 322 in the same configuration as the physical keys. Using this configuration, the user can select the appropriate physical key corresponding to what is shown on the display screen 322. Thus, the desired character, command or function is obtained by depressing the physical key corresponding to the character, command or function displayed at a corresponding position on the display screen 322, rather than touching the display screen 322.

Figure 3A:
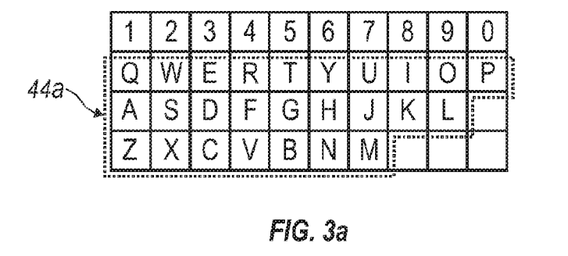
FIG. 3a illustrates an examplary QWERTY keyboard layout.
Figure 3B:
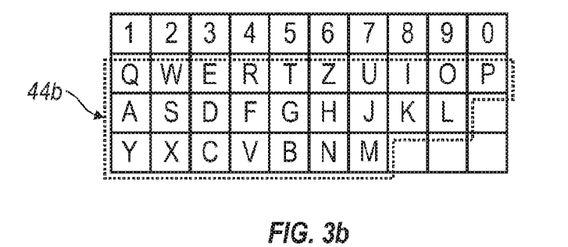
FIG. 3b illustrates an examplary QWERTZ keyboard layout.
Figure 3C:
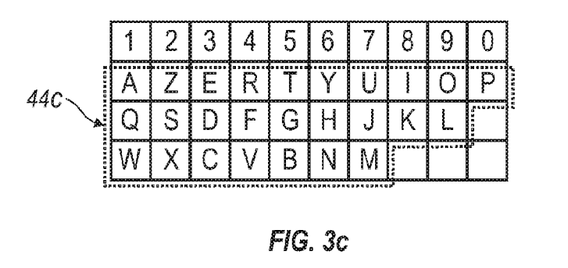
FIG. 3c illustrates an examplary AZERTY keyboard layout.
Figure 3D:
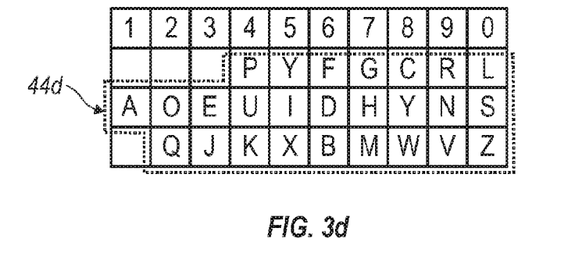
FIG. 3d illustrates an examplary Dvorak keyboard layout.

The various characters, commands, and functions associated with keyboard typing in general are traditionally arranged using various conventions. The most common of these in the United States, for instance, is the QWERTY keyboard layout. Others include the QWERTZ, AZERTY, and Dvorak keyboard configurations. The QWERTY keyboard layout is the standard English-language alphabetic key arrangement 44a shown in FIG. 3a. The QWERTZ keyboard layout is normally used in German-speaking regions; this alphabetic key arrangement 44b is shown in FIG. 3b. The AZERTY keyboard layout 44c is normally used in French-speaking regions and is shown in FIG. 3c. The Dvorak keyboard layout was designed to allow typists to type faster; this alphabetic key arrangement 44d is shown in FIG. 3d. In other examplary embodiments, keyboards having multi-language key arrangements can be implemented.

Figure 4:
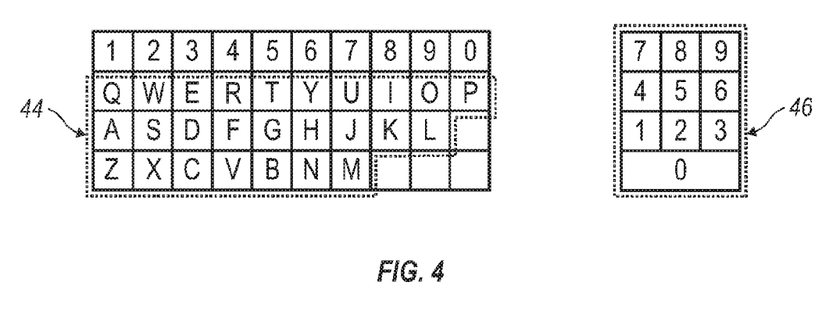
FIG. 4 illustrates a QWERTY keyboard layout paired with a traditional ten-key keyboard.
Figure 9:
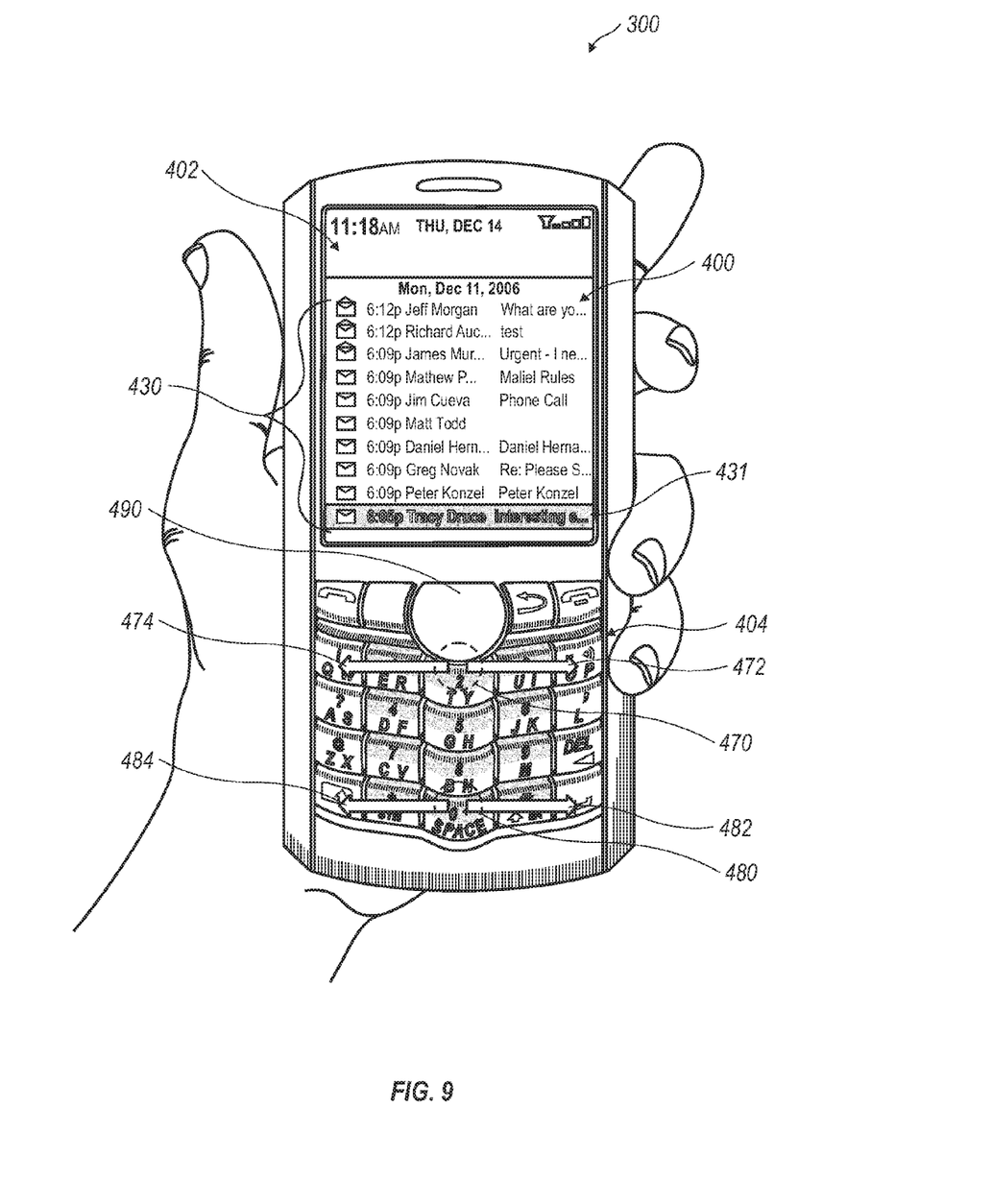
FIG. 9 illustrates a handheld electronic device of FIG. 8. with an email application shown on the display screen and different operator commands indicated on the contact-sensitive area.
Figure 10:
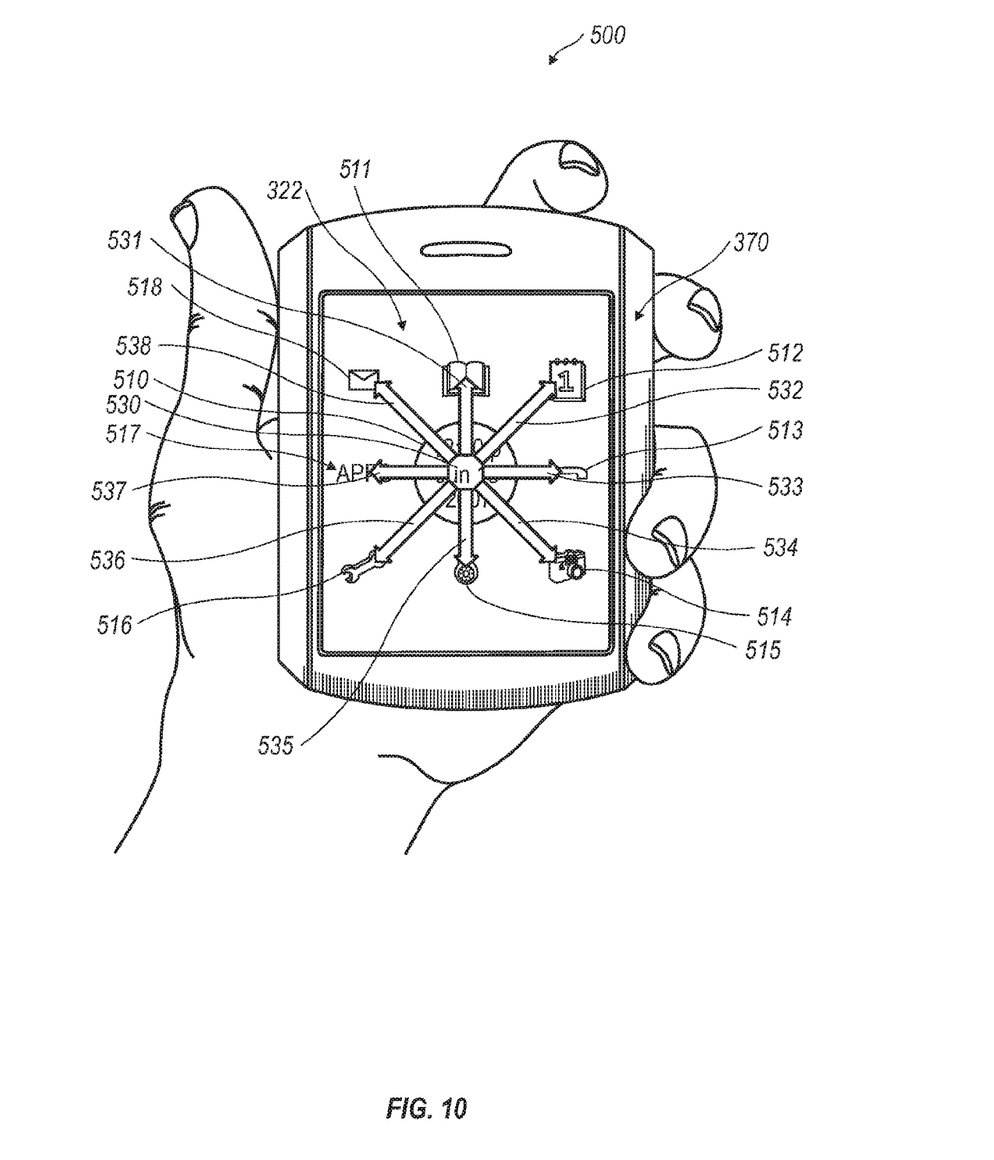
FIG. 10 illustrates a handheld electronic device with an integrated display screen and contact-sensitive area according to the present disclosure.

Alphabetic key arrangements are often presented along with numeric key arrangements. Typically, the numbers 1-9 and 0 are positioned in the row above the alphabetic keys 44a-d, as shown in FIG. 3a-d. Alternatively, the numbers share keys with the alphabetic characters, such as the top row of the QWERTY keyboard. Yet another examplary numeric key arrangement is shown in FIG. 4, where a "ten-key" style numeric keypad 46 is provided on a separate set of keys that is spaced from the alphabetic/numeric key arrangement 44. Still further, ten-key numeric arrangements may be common with or shared with a subset of the alphabetic keys, as best shown in FIGS. 9 and 10. The ten-key styled numeric keypad 46 includes the numbers "7", "8", "9" arranged in a top row, "4", "5", "6" arranged in a second row, "1", "2", "3" arranged in a third row, and "0" in a bottom row. Further, a numeric phone key arrangement 42 is exemplarily illustrated in FIG. 5.

Figure 5:
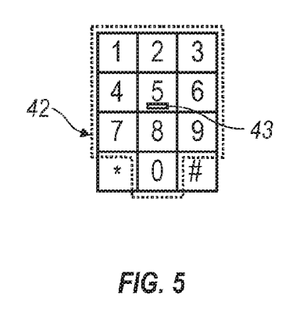
FIG. 5 illustrates ten digits comprising the numerals 0-9 arranged in a traditional, ITU Standard E.161 numeric telephone keypad layout, including the * and # keys flanking the 0 key.

As shown in FIG. 5, the numeric phone key arrangement 42 may also utilize a surface treatment on the surface of the center "5" key. This surface treatment is configured such that the top surface of the key is distinctive from the surface of other keys. Preferably the surface treatment is in the form of a raised bump or recessed dimple 43. Alternatively, raised bumps may be positioned on the housing around the "5" key and do not necessarily have to be positioned directly on the key.

It is desirable for handheld devices 300 to include a combined text-entry keyboard and a telephony keyboard. Examples of such handheld devices 300 include mobile stations, cellular telephones, wireless personal digital assistants (PDAs), two-way paging devices, and others. Various keyboards are used with such devices and can be termed a full keyboard, a reduced-format keyboard, or phone key pad. In embodiments of a handheld device 300 having a full keyboard, the alphabetic characters are singly associated with the plurality of physical keys. Thus, in an English-language keyboard of this configuration, there are at least 26 keys in the plurality, with one letter per alphabetic key.

FIGS. 5 and 6 both feature numeric keys arranged according to the ITU Standard E.161 form. In addition, FIG. 6 also incorporates alphabetic characters according to the ITU Standard E.161 layout as well.

Figure 7:
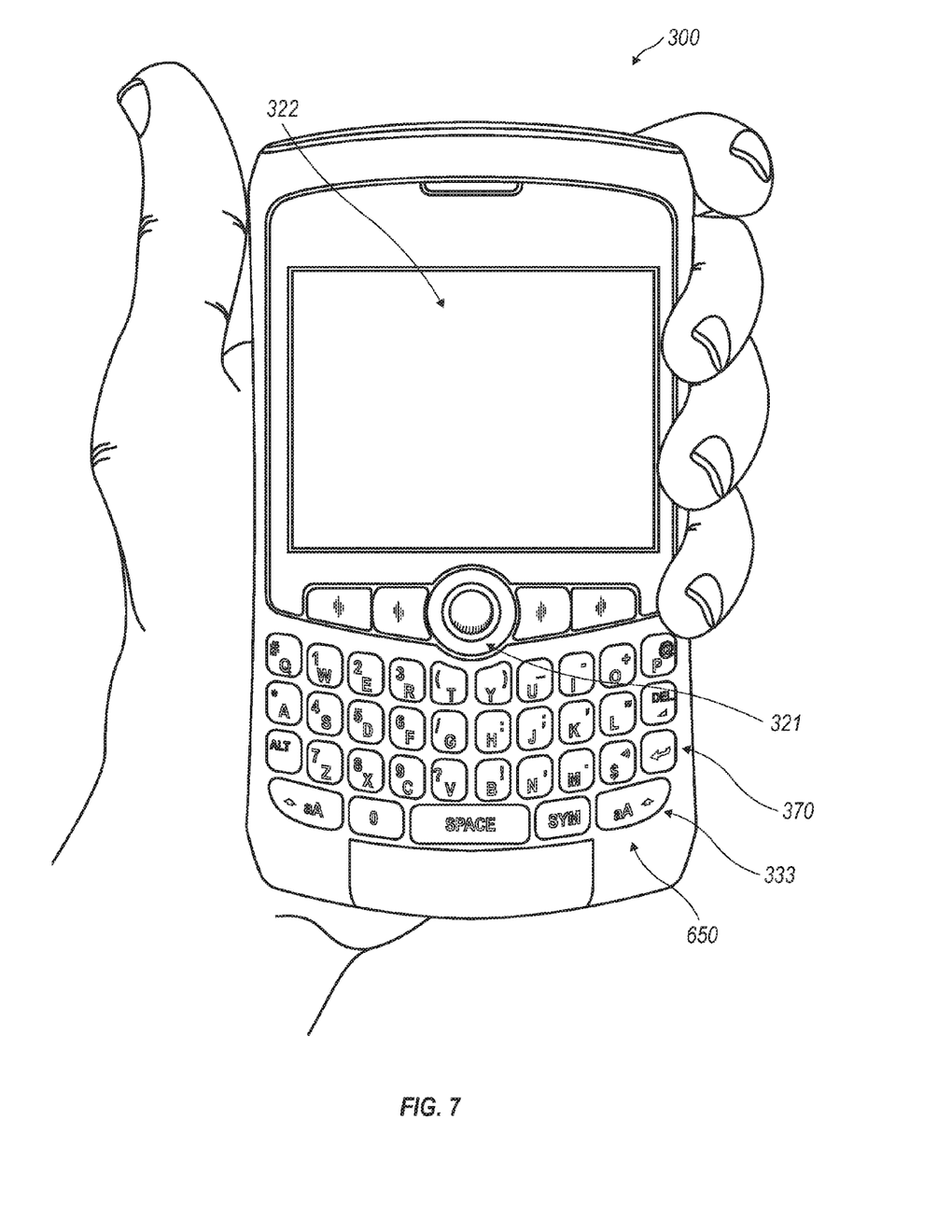
FIG. 7 illustrates a full keyboard handheld electronic device according to the present disclosure.

Reference is now made to FIG. 7, which discloses an examplary embodiment having a fill alphabetic keyboard arrangement. In particular, as shown in FIG. 7, only one letter of the alphabet is associated with any given alphabetic key within the keys of the keyfield. This is in contrast to reduced-format arrangements, in which multiple letters of the alphabet may be associated with at least some of the alphabetic keys of a keyboard. Additionally, as alluded to above and shown in the referenced figures, some of the alphabetic keys also have numbers, symbols, or functions associated with them. In the specifically illustrated embodiment, the alphabetic keys (including those also having numbers, symbols, or functions associated with them are arranged in a QWERTY arrangement, although any of the other full-keyboard arrangements (QWERTZ, AZERTY, or Dvorak) may also be implemented within the scope of this disclosure.

As described above, the International Telecommunications Union ("ITU") has established phone standards for the arrangement of alphanumeric keys. The standard phone numeric key arrangement shown in FIGS. 5 (no alphabetic letters) and 6 (with alphabetic letters) corresponds to ITU Standard E.161, entitled "Arrangement of Digits, Letters, and Symbols on Telephones and Other Devices That Can Be Used for Gaining Access to a Telephone Network." This standard is also known as ANSI T1.703-1995/1999 and ISO/IEC 9995-8:1994. As shown in FIG. 1, the numeric key arrangement can be overlaid on a QWERTY arrangement. The numeric arrangement as shown can be aptly described as a top-to-bottom ascending order three-by-three-over-zero pattern.

While several keyboard layouts have been described above, the layouts can be described as having keys disposed on the keyboard in a QWERTY, reduced QWERTY, QWERTZ, Dvorak, or AZERTY key layout. These familiar keyboard layouts allow users to type more intuitively and quickly than, for example, on the standard alphabetic layout on a telephone pad. As mentioned above, the key arrangements can be reduced compared to a standard layout through the use of more than one letter or character per key. By utilizing fewer keys, the keys can be made larger and therefore more convenient to the user.

In at least one embodiment, a handheld wireless communication device 300 that is configured to send and receive email text messages comprises a hand cradleable body 371 configured to be held in a text entry orientation by an operator or user. (For example see FIGS. 1 and 7). The body 371 of the handheld wireless communication device 300 has a front face 370 at which a display screen 322 is located and upon which information is displayed to the operator of the handheld device 300 in the text entry orientation. The handheld device 300 further comprises a microprocessor configured to run software programs on the handheld device 300 and to receive operator commands from user inputs, such as a keyboard 332 and trackball navigation tool 321, located on the handheld device 300.

As described above, it is common to provide handheld electronic devices with navigation tools such as a trackball, thumbwheel, navigational pad, or the like to allow a user to control navigation on the screen of the handheld electronic device. These navigation tools require additional space within the hand cradleable body 371 as well as occupy space on one of the surfaces of the handheld device such as the front surface. These navigation tools typically provide for discrete movement. This enables the user to exert a desired degree of precision in selecting or navigating amongst the displayed items. The following embodiments present the use of contact-sensitive surfaces which can be used in place of the above described navigation tools or can be used in conjunction with the above described navigation tools. Furthermore, the navigation tool can be a contact-sensitive surface. When the navigation tool is a contact-sensitive surface, it can be used either as supplemental navigational tool or as the navigational tool for the handheld electronic device. The trackball tool shown in FIGS. 1. and 7 has been replaced by a key 490 that can programmed as a special function key in FIGS. 8 and 9. The special function key can be user programmable or a predetermined function. While the function key 490 is illustrated, this disclosure contemplates retaining the trackball 321 of FIGS. 1 and 7 instead.

Contact-sensitive surfaces have continually developed and their inclusion on handheld devices has increased. These contact-sensitive surfaces are enabled to detected touching through a variety of different contacts with the surface. In some cases the contact-sensitive surface can detect touch engagement from a stylus or other object designed for inputting data using the contact-sensitive surface. The stylus or other object often has a very defined point that can be used to make selections of different visually presented graphical user interface items on the display screen. The items presented visually thereon can be icons, buttons, text or other commonly presented items for user selection. The user generally interacts with these graphical user interface items by tapping or touching the contact-sensitive surfaces with the stylus or other object. The other object can be a user's finger. While not all surfaces respond to contact from a user's finger, some surfaces require such finger engagement where a conductive contact-sensitive surface is used. In these conductive contact-sensitive surfaces, the finger or other conductive object need not actually contact the surface, but instead just be placed in close proximity to the contact-sensitive surface.

The contact-sensitive surfaces can be adapted to exhibit a variety of different surface clarifies among which include opaque, translucent, transparent or semitransparent surfaces based on their composition. These different surface clarifies enable the implementation of different contact-sensitive surfaces. Sometimes it is desirable to have an opaque surface so that the surface includes the standard touch sensitive surfaces that are used for input on laptop computers and the like where a solid looking surface is need. This hides the other items such as electrical inputs used beneath the contact-sensitive surface. A translucent surface can be implemented in situations where lighting of the surface is desired without the ability to see through the surface. For instance where the contact-sensitive surface is inscribed with characters or other indicia, the contact-sensitive surface can be a translucent surface in order to light the characters or other indicia on the surface. In other embodiments, a transparent or semi-transparent surface can be used where it is desirable to reveal objects or graphically presented information beneath the contact-sensitive surface.

Figure 8:
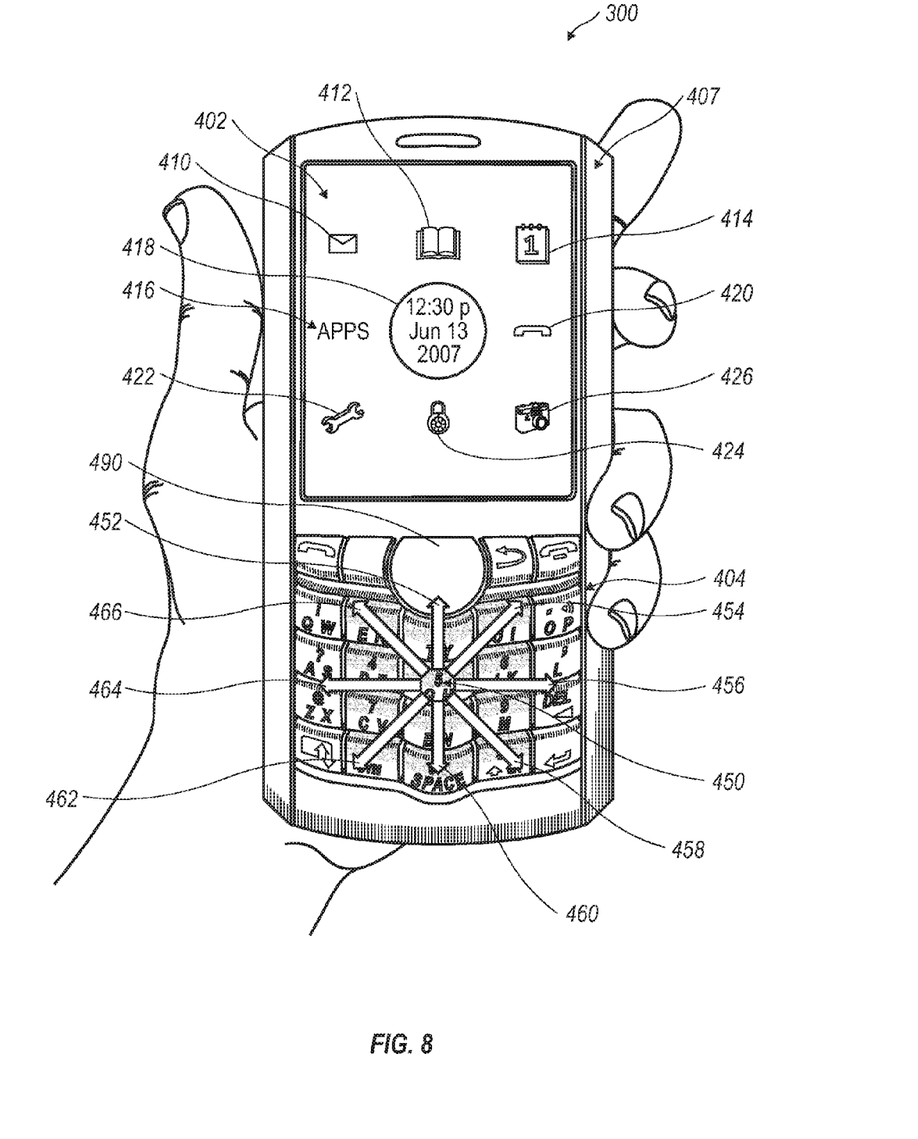
FIG. 8 illustrates a handheld electronic device with a contact-sensitive area including arrows indicating possible directional motion to launch one of the applications on the display area above the contact-sensitive area.

An exemplary handheld electronic device 300, as illustrated in FIG. 8, includes but is not limited to a microprocessor housed within a body 371 which includes a display area 402. and a contact-sensitive area 404. The contact-sensitive area 404 can be made from one of the above described contact-sensitive surfaces. The display area 402 can be made using standard display screen technology such as a liquid crystal displays (LCD). In at least one embodiment, the display area 402 and contact-sensitive area 404 occupy substantially the same portion of the body 371. In another embodiment, the contact-sensitive area 402 and display area 404 are superimposed, one on the other at a front side of the handheld device, as illustrated in FIG. 10. In yet another embodiment, the contact-sensitive area 404 and display area 402 are located adjacent to one another at a front side 407 of the handheld device 300, as shown in at least FIG. 8.

A handheld electronic device 300 can be provided with a contact-sensitive area 404 to accommodate input operator commands. These operator commands are generally in consideration of information which is visually presented to the operator on a display area 402 such as a display screen. The contact-sensitive area detects contact engagement therewith and produces instruction data based thereupon. This contact-sensitive area 404 can be used to control the display of information presented to the operator on the display area 402. For instance, when a home screen page is shown on the display area 402 of the handheld electronic device 300, the operator can select an application to run on the handheld device 300. When an application is running on the handheld device 300, the operator can further make selections of information presented on the display area 402. The information shown on the display area 402 can include buttons, icons, characters, text or other graphical display items.

In order to accommodate receiving operator commands from the contact-sensitive area 404, a microprocessor-run software program, which receives instruction data from the contact sensitive area, is provided. The contact-sensitive area 404 detects a sweeping motion that originates at a home zone area of the contact-sensitive area 404. The home zone area is a predetermined portion of the contact-sensitive area 404. The home zone area can be a single location or a plurality of locations. In the example embodiment shown in FIG. 8, the home zone area 450 is located substantially in the center of the contact-sensitive area 404. In another embodiment illustrated in FIG. 9, the home zone area 470 is located a top-center portion location. Alternatively, the home zone area 480 of the embodiment shown in FIG. 9 can be located at a bottom-center portion location. Other locations of the home zone area are also possible can be contemplated by those skilled in the art. Furthermore, the contact-sensitive area 404 and corresponding software program can be enabled to include one or more of the above described home zone locations.

The software program can be programmed to process the instruction data and determine a sweeping contact motion detected on the constact-senstive area originating at the home zone area. If a sweeping motion is sensed on the contact-sensitive area 404 originating at a home zone area, the software program responsively launches an activity when the sweeping motion terminates at an activity launch zone area. The termination point is generally indicated by the arrow heads shown in FIGS. 8-10, which can overlap with the icons shown on the display screen as illustrated in FIG. 10. A plurality of activity launch zone areas are provided in order to accommodate launching a variety of different activities. Some examples of activities considered within the scope of this disclosure include applications, menu functions, navigation functions, and selection functions. These functions and applications examples of activities, but other activities that are associated with operation are considered within the scope of this disclosure as well. The particular activity that is launched can be dependent upon which of the home zone areas 450, 470, 480 the sweeping contact motion originated. Likewise, the particular activity that is launched can be in dependence upon the termination of the sweeping contact motion. Furthermore, the particular activity can depend upon both the originating home zone area as well as the terminating activity launch zone area. Several examples are presented below to further illustrate such dependence.

For example, consider the situation as illustrated in FIG. 8 where a sweeping contact motion is sensed originating at a center home zone 450 located approximately in a center portion of the contact-sensitive area 404. For illustrative purposes a few exemplary paths that sweeping contact could take are illustrated by the arrows in FIGS. 8-10. If the sweeping motion is detected that emanates from the center home zone location 450, then the software determines that an application launch condition is present. The software can launch a particular application based upon the termination of the sweeping motion. For instance, when the sweeping motion originates at the center home zone location and is directed in an upwardly fashion, as indicated by arrow 452, the application indicated by icon 412 that is displayed on the screen at the top center location is launched. In this case an address book application is launched. Thus, in at least some embodiments, the application that launches in response to the sweeping contact motion originating at the home zone area is an application associated with a graphical display item positioned in a substantially parallel direction to the sweeping motion.

As shown in FIG. 8, an address book icon 412 is shown in the top center portion of the display. When the sweeping motion originating at the center home zone 450 and moves upward along the path indicated by the upward arrow 452, the address book icon 412 that is located above the home location 418 causes an address book application to launch. Thus, the operator can select applications from among those applications indicated with icons or other graphical display items on the display area 402. For example, an email icon 410, address book icon 412, calendar icon 414, application icon 416, phone icon 420, options icon 422, keyboard lock icon 424, and camera icon 426 are shown on the display area 402. These icons enable the user to select one of the applications associated with each of the icons. In the case of the application icon 416, additional application icons will be displayed when this icon is selected.

In the center of the display area 402, a home location 418 provides information regarding the state of operation of the handheld device 300. For example, the home location 418 can display information regarding date, time, wireless connectivity, battery life, signal strength, currently running program, and the like. Furthermore, the home location 418 can provide information regarding the launching of an application which could be implemented through an arrow displayed in the home location 418 pointing to the application that the user is making a sweeping contact motion. This indicator arrow can be dynamic such that it indicates when the operator has successfully instructed the handheld to launch a specific activity.

An operator can select from one of the various icons and associated programs by making a sweeping motion originating at the center home zone location and moving in a direction substantially along one of the indicated arrows 452, 454, 456, 458, 460, 462, 464, or 466. When the sweeping contact motion is along an upward right diagonal direction indicated by arrow 454, a calendar icon 414 in the top right corner of the display is selected along with its application, which is a calendar application in FIG. 8. Similarly, when the sweeping contact motion is along a right direction indicated by arrow 456, a telephone icon 420 in the center right portion of the display is selected along with its application, which is a phone application. Likewise, when the sweeping contact motion is along a downwardly right direction indicated by arrow 458, a camera icon 426 in the bottom right portion of the display is selected along with its application, which is a camera application. Furthermore, when the sweeping contact motion is along a downwardly direction indicated by arrow 460, a keyboard lock icon 424 in the bottom right portion of the display is selected along with its application, which is a keyboard lock application. Likewise, when the sweeping contact motion is along a downwardly left direction indicated by arrow 462, an option icon 422 in the bottom left portion of the display is selected along with its application, which is an options application. Yet, when the sweeping contact motion is along a left direction indicated by arrow 464, an applications icon 416 in the center left portion of the display is selected along with its application, which is an application subfolder. Likewise, when the sweeping contact motion is along an upwardly left direction indicated by arrow 466, an email icon 410 in the top left portion of the display is selected along with its application, which is an email application.

While the arrangement of icons in FIG. 8 only displays eight icons for user selection, it is possible to construct other arrangements with more than eight or fewer than eight icons for user selection. If other icons are presented, the home zone location can remain the same and additional activity launch locations can be provided corresponding to the locations of the additional icons. Likewise, if there are fewer applications the activity launch locations can be reduced as necessary. Furthermore, the positioning of the icons could be arranged in a variety of orders but a preferred arrangement is shown.

In at least one embodiment, the display area 402 can be provided with additional graphical information to assist the user in making the selection of the appropriate application associated with the icons shown on the display area 402. For example, indicator arrows that show the trajectory of the sweeping contact motion on the contact-sensitive area could be provided on the display area 402 or within the home location 418 as described above.

An email program with a listing of emails 430 is shown in FIG. 9. This email application can be launched in response to the operator selecting the email icon 410 as illustrated in FIG. 8. The emails are listed on the display area 402 which is located on a front side 407 of the handheld electronic device 300. One email message 431 of the email listing is highlighted indicating that it is available for selection. The email message 431 can be selected for opening, transferring, storing, or the like as enabled by the email software application running on the microprocessor of the handheld electronic device.

In addition to selecting applications for execution by the microprocessor, the sweeping contact motion can perform additional input commands. For example, the sweeping contact motion can cause the display area 402 to present a menu to the operator, perform an escape function and perform a select function. Other functions or activities are considered within the scope of this disclosure as well. An exemplary illustration of operator indication of functions is provided in FIG. 9. For example, if the operator would like to return to the home screen, an escape or back up command is desired. Using a sweeping motion similar to those described above, the operator can touch a home zone location corresponding to the escape command and engage in a sweeping contact motion that terminates at the appropriate activity launch zone that corresponds to the escape command. Operators of the device may be naturally inclined to perform motions that sweep to the left to execute this function, so in at least one embodiment the escape function is enabled by sweeping to the left from a home zone area. Since the sweeping motion to the left could launch a particular application in certain applications, the home zone area in at least one embodiment is located in a different area than home zone location used for launching particular applications.

As shown in FIG. 9, two additional home zone areas 470, 480 can be provided in addition to the home zone area 450 shown in FIG. 8. A top home zone area 470 is located near the top center location of the contact sensitive surface. A bottom home zone area 480 is located near the bottom center location of the contact-sensitive surface. When these two additional home zone areas 470, 480 are provided the detection of the same direction of sweeping motion can be used with different activities being launched depending on which home zone area is used. Furthermore, it is possible to use a combination of home zone location and activity launch zone to further specify which activity is implemented. As illustrated when sweeping contact motion is detected that originates at the top home zone area 570 and moves in leftward direction substantially along arrow 474, a back or escape function is implemented. Thus, when the operator causes the device to perform the escape function the email application shown on the display area 402 can he replace by a previously selected application or the home screen for example the display area could be transitioned back to the home screen of FIG. 8.

Additionally, select and menu functions/commands can be made using the sweeping contact motion on the contact-sensitive area 404. In at least one embodiment, a sweeping motion originating at the bottom home zone area 480 and moving to the right in a direction substantially indicated by arrow 482 implements a menu function, where a menu is presented on the display area 402. For example, the menu function when executed while the email 431 is highlight could present a menu to the operator listing functions that could be performed on the selected message. These menu options could include save, open, delete, forward, reply, reply all or other appropriate options as one skilled in the art would appreciate. In at least one embodiment, a sweeping motion originating at the top home zone area 470 and moving to the right, for example along arrow 472, implements a select function, where a select function is performed. This select function for instance could open up the email 431 indicated on the display area 402. Alternatively, this select function can be used in cases where operator selectable items are displayed on a menu, application, or the like.

While the menu, escape, and select functions have been described in relation to a separate figure, these functions can be implemented simultaneously with the application selection routines previously described. It is contemplated that function and selection routines could be implemented separately or in dependence upon a particular displayed application page. For instance the selection routines could be used only for making selection of applications from home screen or sub-screens thereof. Once a given application is running and presented on the display screen, the functions could be the only activities available using the sweeping motion.

The location of the contact-sensitive area can be in a variety of different locations. As shown in the figures, the contact-sensitive area is located beneath or in conjunction with the keyboard. Alternatively, the contact-sensitive area can be provided as part of the display screen or superimposed on the display area. Preferably, the contact-sensitive area is provided on the front side of the handheld device. In at least one embodiment, the contact-sensitive surface is provided adjacent to the display area.

If the contact-sensitive area is provided in conjunction with a keyboard, the contact-sensitive area can be overlaid by the keyboard, The input keys of the keyboard can be depressibly actuatable such that when the key is depressed it actuates a portion of the contact-sensitive area. When the operator engages in the sweeping contact motion, the keys depress and cause contact with the contact-sensitive area beneath the keys. This sweeping motion is then passed to the microprocessor for further processing. While in another embodiment, the input keys are contact actuatable such that touching the key is enough to actuate the key. In this case the keys can be individually shaped but are part of a single surface. Furthermore, the shape of each key can be designed to accommodate the sweeping contact motion. For example the keys could be aligned to accommodate a diagonal input. Additionally, the surfaces of the keys could be smooth or provided with a slight texture in order to facilitate both entry using the keys and the sweeping motion described above. Furthermore, the keys can be presented using a virtual keyboard display. Thus, the keyboard could be provided on a portion of the display area and a portion of the display area could be positioned above or below the contact sensitive area.

The keyboard as shown in FIG. 8 is the same as FIG. 1 which includes a plurality of input keys which can be associated with alphabetic, numeric, or command values. As shown in FIG. 1, the handheld wireless device 300 can include a key field 650 that is located below the display screen at the front face 370 of the body 371 and the key field 650 comprises a plurality of keys of which a portion are alphanumeric input keys. These alphanumeric input keys comprise alphabetic keys which have letters arranged in one of the above described arrangements including but not limited to QWERTY, QWERTZ, AZERTY, and Dvorak arrangements. Furthermore, the arrangement can be of a full arrangement or reduced arrangement as described above, wherein the reduced arrangement has more than one letter associated with at least one key. As shown in FIG. 7, a full QWERTY arrangement is provided on keyboard 332 along with additional numeric, symbol and function keys. A reduced QWERTY arrangement is presented in FIG. 1. Additionally, a trackball navigation tool 321 is located between the display and the key field 650 in the text entry orientation. In some embodiments, no navigation tool is used besides the contact-sensitive area. In those cases, the contact-sensitive area provides for navigational control as well as launching the activities as described above. While the implementation of the contact-sensitive area has been described generally in relation to the reduced keyboard layouts, it can be implemented with respect to the full keyboard layout as illustrated by FIG. 7. Furthermore in some embodiments, the handheld device is provided without a separate keyboard and instead uses a touch or contact-sensitive screen for user input as illustrated in FIG. 10.

As illustrated in FIG. 10, the handheld device 500 has a display screen 322 which provides for both the display area and contact-sensitive area. Here like the above described embodiments, an activity is launched when a sweeping contact motion originating at a home zone area and terminating at one of the activity launch zones is detected. As illustrated when the operator makes contact with the home zone location 530 which corresponds to the home location 510 and makes a sweeping motion as indicated by arrow 531 towards address book icon 511, an address book application is launched. Similarly operator sweeping contact along arrows 532 to 538 launch applications associated with icons 512 to 518, respectively. While not illustrated, the handheld device 500 as illustrated in FIG. 10 could also be configured for inputting of the activities as described in relation to FIG. 9. While these examples of activities have been provided, additional activities could also be provided without departing from this disclosure.

Figure 11:
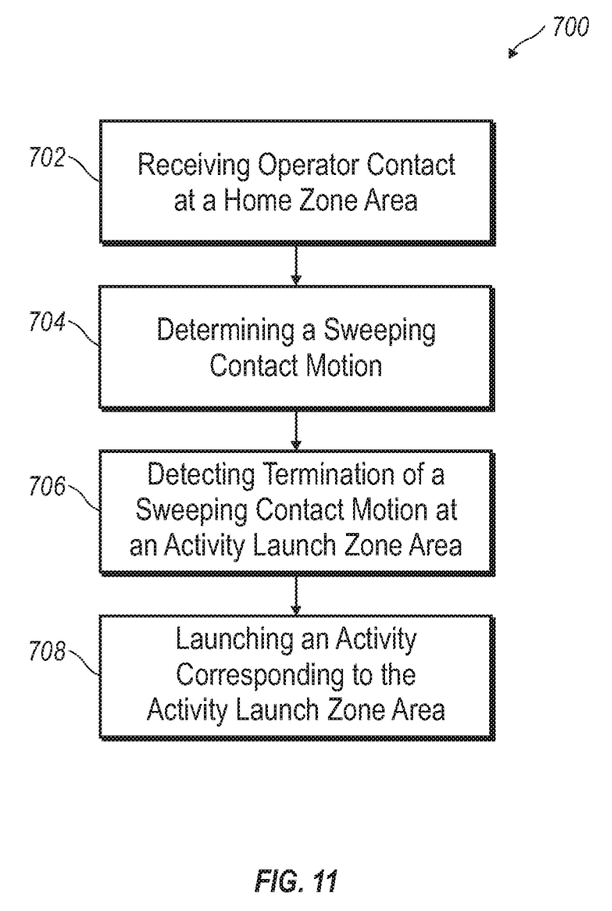
FIG. 11 illustrates an examplary method of selectively launching an activity on a handheld electronic device.

Additionally as illustrated in FIG. 11, an exemplary method 700 for selectively launching an activity on a handheld electronic device is disclosed. The method can receive an operator contact at a home zone location (block 702). Further the method detects that a sweeping contact motion across a contact-sensitive area originating at the home zone area (block 704). Additionally, the method can detect a termination of the sweeping contact motion at an activity launch zone area (block 706). Then, the method launches an activity corresponding to the activity launch zone area at which the sweeping contact motion terminated (block 708).

While in at least one embodiment, the method further includes launching an activity on a handheld electronic device which is launched depending upon which of the plurality of home zone areas, the determined sweeping contact motion originated. In at least one embodiment, the method opens an application in response to a detected sweeping contact motion originating at the center home zone area, The method can also include one or more of the following detected sweeping contact motions that launch an activity. In one example, the method invokes a select function that is activated by the detection of a sweeping motion originating at a top home zone area and moving rightward. In another example, the method invokes a menu function that is activated by the detection of a sweeping motion originating at a bottom home zone area and moving rightward. In still another example, the method invokes an escape function that is activated by the detection of a sweeping motion originating at a bottom home zone area and moving leftward. While in other embodiments, the method can be dependent upon only one of the home zone location or activity launch area selected by the sweeping contact motion.

Examplary embodiments have been described hereinabove regarding both handheld wireless communication devices 300, as well as the communication networks 319 within which they operate. Again, it should be appreciated that the focus of the present disclosure launching an activity when a detected sweeping contact motion is sensed on a contact sensitive area originating at a home zone area and terminating at one of the activity launch zone areas.

What is claimed is:

1. A handheld electronic device comprising:
a display area adapted to render information;
a contact-sensitive area adapted to detect contact engagement therewith;
a processor communicatively coupled with the display and contact-sensitive area; and
a memory comprising instructions which, when executed by the processor, causes the processor to perform the steps comprising:
rendering a home location and application icons on the display area;
detecting a first sweeping motion on the contact-sensitive area originating at a single home zone area and terminating at one of a plurality of activity launch zone areas, wherein the first sweeping contact motion is associated with the single home zone area, the single home zone area corresponds to the home location, and each activity launch zone area corresponds to one of the application icons;
launching an application corresponding to the activity launch zone area at which the first sweeping contact motion terminated;
following the launch of the application, detecting a second sweeping motion on the contact-sensitive area originating at one of a plurality of home zone areas and terminating at one of a plurality of activity launch zone areas, wherein the second sweeping contact motion is associated with the plurality of home zone areas, each of the plurality of home zone areas is different than the single home zone area, each activity launch zone area corresponds to an associated function corresponding to the launched application, and a plurality of functions associated with the plurality of activity launch zone areas are the only functions performed by the second sweeping contact motion; and
executing the function corresponding to the launched application and activity launch zone area at which the second sweeping contact motion terminated.

2. The handheld electronic device as recited in claim 1 wherein the single home zone area is located approximately in a center portion of the contact-sensitive area.

3. The handheld electronic device as recited in claim 1 wherein the first sweeping contact motion originates at the single home zone area and is substantially straight from the single home zone area to the activity launch zone.

4. The handheld electronic device as recited in claim 1 wherein the plurality of home zone areas include a bottom home zone area located substantially in a bottom-center portion of the contact sensitive area and a top home zone area located substantially in a top-center portion of the contact sensitive area.

5. The handheld electronic device as recited in claim 4 wherein at least one of the associated functions comprise: select, escape and menu.

6. The handheld electronic device as recited in claim 1 wherein the contact-sensitive area is overlaid by a keyboard comprising a plurality of input keys.

7. The handheld electronic device as recited in claim 6 wherein the input keys are depressibly actuatable.

8. The handheld electronic device as recited in claim 6 wherein the input keys are contact actuatable.

9. The handheld electronic device as recited in claim 6 wherein the input keys are finger actuatable.

10. The handheld electronic device as recited in claim 1 wherein the contact-sensitive area and the display area are superimposed, one on the other at a front side of the device.

11. The handheld electronic device as recited in claim 1 wherein the contact-sensitive area and the display area are located adjacent to one another at a front side of the device.

12. The handheld electronic device as recited in claim 1 wherein the plurality of home zone areas are located in substantially equally spaced portions of the contact-sensitive area.

13. A method for a handheld electronic device, the method comprising:
rendering a home location and application icons on a display area of the handheld electronic device;
detecting a first sweeping motion on a contact-sensitive area originating at a single home zone area and terminating at one of a plurality of activity launch zone areas, wherein the first sweeping contact motion is associated with the single home zone area, the single home zone area corresponds to the home location and each activity launch zone area corresponds to one of the application icons;
launching an application corresponding to the activity launch zone area at which the first sweeping contact motion terminated;
following the launch of the application, detecting a second sweeping motion on the contact-sensitive area originating at one of a plurality of home zone areas and terminating at one of a plurality of activity launch zone areas, wherein the second sweeping contact motion is associated with the plurality of home zone areas, each of the plurality of home zone areas is different than the single home zone area, each activity launch zone area corresponds to an associated function corresponding to the launched application, and a plurality of functions associated with the plurality of activity launch zone areas are the only functions performed by the second sweeping contact motion; and
executing the function corresponding to the launched application and activity launch zone area at which the second sweeping contact motion terminated.

14. The method as recited in claim 13 wherein the single home zone area is located approximately in a center portion of the contact-sensitive area.

15. The method as recited in claim 13 wherein the first sweeping contact motion originates at the single home zone area and is substantially straight from the single home zone area to the activity launch zone.

16. The method as recited in claim 13 wherein the plurality of home zone areas include a bottom home zone area located substantially in a bottom-center portion of the contact sensitive area and a top home zone area located substantially in a top-center portion of the contact sensitive area.

17. The method as recited in claim 13 wherein at least one of the associated functions comprise: select, escape and menu.

18. The method as recited in claim 13 further comprising overlaying a keyboard comprising a plurality of input keys over the contact-sensitive area.

19. The method as recited in claim 13 further comprising superimposing the contact-sensitive area and the display area, one on the other at a front side of the device.

20. The method as recited in claim 13 wherein the plurality of home zone areas are located in substantially equally spaced portions of the contact-sensitive area.

* * * * *